May 19, 1925.  1,538,028
A. W. DAVIS
COMPOSITE CUTTER BLADE AND PROCESS OF MAKING THE SAME
Filed Jan. 30, 1923
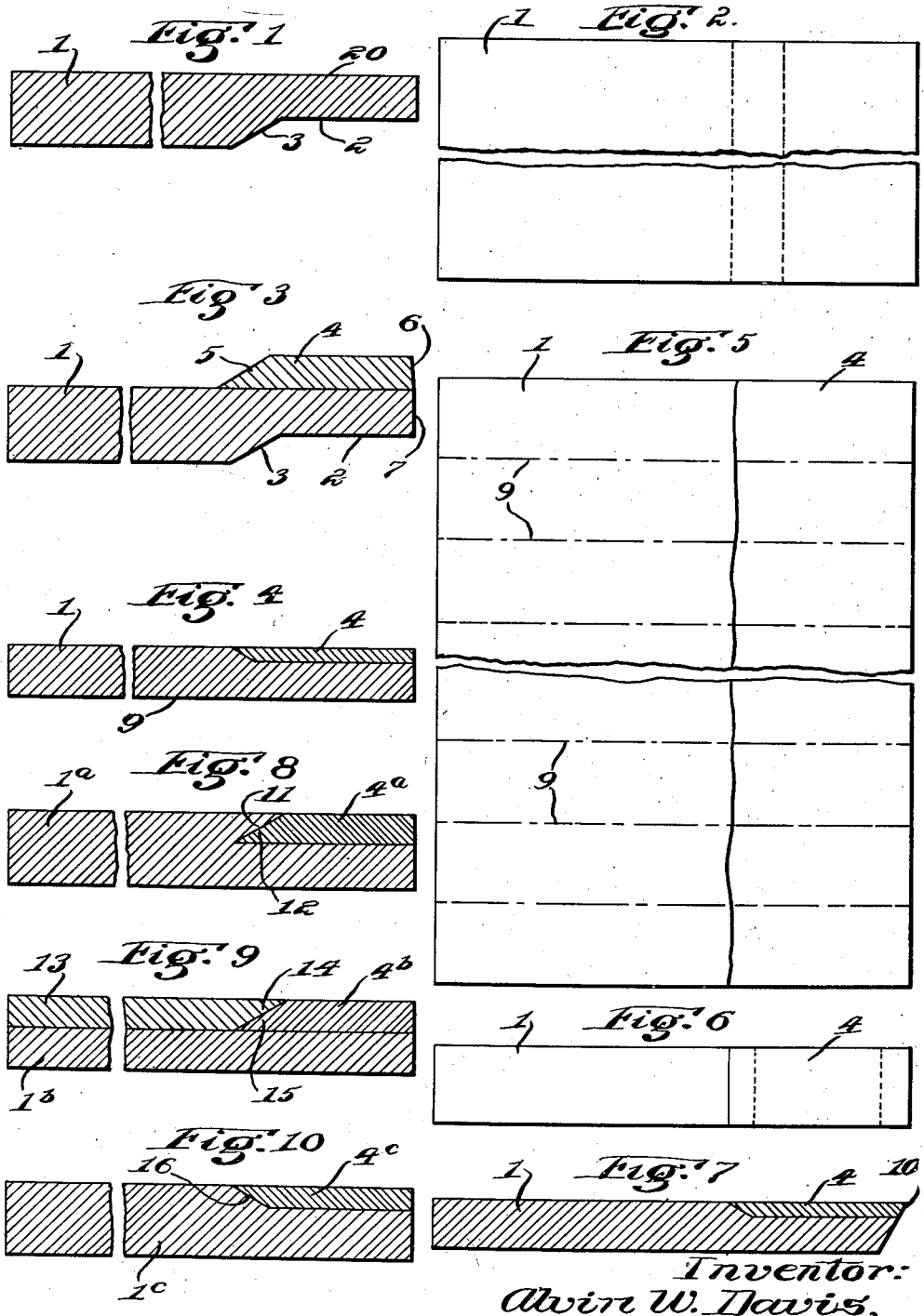
Inventor:
Alvin W. Davis,
by Roberts, Roberts & Cushman,
atty's.

Patented May 19, 1925.

1,538,028

UNITED STATES PATENT OFFICE.

ALVIN W. DAVIS, OF NORTH LEOMINSTER, MASSACHUSETTS, ASSIGNOR TO SIMONDS SAW AND STEEL COMPANY, OF FITCHBURG, MASSACHUSETTS, A CORPORATION OF MASSACHUSETTS.

COMPOSITE CUTTER BLADE AND PROCESS OF MAKING THE SAME.

Application filed January 30, 1923. Serial No. 615,827.

*To all whom it may concern:*

Be it known that I, ALVIN W. DAVIS, a citizen of the United States of America, and resident of North Leominster, in the county of Worcester and State of Massachusetts, have invented new and useful Improvements in Composite Cutter Blades and Processes of Making the Same, of which the following is a specification.

This invention pertains to the manufacture of cutter blades such for example as those employed in paper cutting machines, planers, leather splitters, wood chippers, etc., and relates more specifically to the manufacture of cutter blades whose cutting edges are of hard and wear resistant metal while the body of the blade is of softer, tougher and cheaper material.

The usual practice in welding a tool steel facing to a soft steel backing for the manufacture of such blades is to place the facing upon the backing, with the interposition of a suitable flux, such for example as powdered borax, and after bringing the parts to welding temperature to pass them repeatedly between rolls which at each pass are brought closer together in order to squeeze the parts into intimate contact, so that if the operation be properly performed the parts are integrally united and no joint or line of demarcation between them is perceptible, the metal of course being elongated and thinned down by the rolling process.

For certain classes of work where the cutting edge of the blade is driven at high speed or under heavy pressure into the material being worked, the ordinary high carbon or tool steels, however carefully they may be treated and tempered, fail to retain a sharp edge for any considerable length of time, either by reason of actual wear and abrasion, or on account of the high temperatures generated at the cutting edges. It thus becomes very desirable to use some more durable material for the cutting edge of the knife blade and for this purpose the so-called "high-speed" steels appear pre-eminently suitable. As is well known such high-speed steels are alloys having in addition to the usual constituents of high carbon steel certain of the rarer metals such for example as vanadium and tungsten, the presence of which increases the strength of the metal and its ability to retain its hardness even at a red heat. As a specific instance of such a steel, that known commercially as Rex A. A. may be mentioned, the non-ferrous ingredients of which are shown by analysis to be approximately as follows:

| | |
|---|---|
| Carbon | .60 to .75 |
| Phosphorus | .02 Max. |
| Sulfur | .02 Max. |
| Manganese | .25 |
| Silicon | .20 |
| Chromium | 3.50 to 4.00 |
| Vanadium | .60 to 1.00 |
| Tungsten | 18.00 to 19.50 |

The suitability of such high-speed steel for the desired purpose is manifest but heretofore when it has been attempted to weld a facing of high-speed steel to a soft steel backing by the methods above referred to and which are commonly employed in the welding of tool steel and soft steel, the results are far from satisfactory, as at the completion of the process it is found that the high-speed steel is filled with cracks, visible or incipient, and is not continuously joined to the soft steel so that it readily chips away from the latter, while its internal structure has been so modified that it will no longer hold a cutting edge for any length of time.

The object of the present invention is to provide a practical process by the practice of which high-speed steel may be securely united to a backing of soft steel without in any substantial degree sacrificing the normal physical characteristics of the high-speed steel and without developing serious internal strains or incipient cracks therein, as well as to provide a cutter blade comprising a soft steel backing and an edge forming member of high-speed steel securely united thereto in accordance with the foregoing process.

With this object in view and after a long series of experiments and tests to determine the cause of the previous failures I have discovered a commercially practicable method of procedure which results in the production of cutter blades having the desired characteristics and which can be produced at a cost such as to permit of their employment whenever an extremely hard and wear-resistant cutter is needed.

As the results of my various experiments, I have discovered that one of the underlying causes of failure in previous attempts to weld high-speed steel to softer steels resides in the widely different ductilities of the several metals at the temperatures to which they are subjected during welding. For example, accurately conducted tests have shown that the elongation and ductility of soft steel such as is suitable for the backing of the cutter is almost identical with that of high carbon or tool steel, such as has previously been employed in forming the facing of the cutter, both at the welding temperature and at the much lower temperature existing at the later stages of the rolling operation. At the welding temperature of approximately 2,025° F. the ductility of high-speed steel is sufficiently close to that of soft steel at the same temperature to permit working them in contact without substantial slippage or crawl of the metals relatively to each other but its ductility decreases so rapidly as the temperature drops that at 1,600° F. its ductility is only about one-half as great as at the welding temperature. It is thus clear that there is a certain comparatively narrow critical range of temperature within which the ductility ratio of the high-speed and soft steel is such as to permit them to be worked simultaneously while in contact without developing any substantial tendency of the components to slip relatively to each other or to develop excessive internal strain, and that while soft steel and high carbon or tool steel may successively be united by prolonged working involving several successive rollings at progressively decreasing temperatures, any attempt to prolong the welding process as applied to a combination of soft steel and high-speed steel at temperatures below the critical range must necessarily result in failure, as the inability of the high-speed steel to stretch at a rate at all commensurate with the rate of elongation of the soft steel backing, destroys the incipient union between the parts, producing those lines of cleavage which have been found to occur as a result of such a process and which cause the high-speed steel to chip off from its backing. Moreover, the continued manipulation of the high-speed steel by rolling or forging after its temperature has dropped substantially below the welding point and while it rests upon the cushion provided by the relatively soft and ductile backing, must clearly result in the formation of cracks or checks in the harder and less ductile material which instead of flowing smoothly under the action of the rolls is cracked transversely into a series of irregular narrow strips which are pushed ahead of the rollers leaving fissures of visible width between them in the finished article and producing innumerable fine and invisible cracks and lines of strain, all of which weaken the blade and make it impossible to produce a true and continuous cutting edge thereon.

After determining the above facts as to the relative ductility of the various steels at the temperatures to which they are subjected in the welding process, and after long experimentation based upon such facts, I have discovered that substantially perfect results may be secured by employing the following course of procedure, certain steps of which are illustrated by way of example in the accompanying drawings, in which:

Fig. 1 is a fragmentary vertical cross section of a bar of soft steel which has been prepared in accordance with a preferred course of procedure to constitute the backing for the cutter;

Fig. 2 is a fragmentary plan view of the bar shown in Fig. 1;

Fig. 3 is a section similar to Fig. 1, but showing the bar of high-speed steel as resting upon the upper surface of the backing bar;

Fig. 4 is a fragmentary vertical cross section of the composite bar after the welding operation has been performed;

Fig. 5 is a plan view of the bar shown in Fig. 4;

Fig. 6 is a plan view of a completed knife or cutter and

Fig. 7 is a vertical cross section of the same;

Fig. 8 is a fragmentary vertical cross section of a cutter constructed in accordance with a modified course of procedure;

Fig. 9 is a similar view showing a further modification; and

Fig. 10 is a similar view showing a still further modification.

In accordance with the preferred process a bar 1 of soft steel suitable to form the backing of the cutter blade and of a thickness considerably greater than is desired in the finished cutter is scarfed off on its under side as indicated at 2 to an amount substantially equal to the thickness of the bar of high-speed steel to be welded thereto, the scarfed portion of the bar terminating in a bevelled face 3, this producing a recess in the under side of the bar of a shape and volume substantially equal to that of the bar of high speed steel to be welded to the backing. The upper face 20 of the soft steel bar is now preferably sprinkled with a flux such as borax and the bar is preheated to approximately 1800° F. The bar is now withdrawn from the preheating furnace and its upper surface is carefully cleaned to remove scraps of scale and flux. The clean surface is now sprinkled with fine chips of steel, preferably such as will pass through a twelve to sixteen mesh screen, together with clean borax and upon this prepared surface a bar 4 of high speed steel is placed. This bar is preferably bevelled at one edge as shown at 5 on an angle approximating that of the bevel of the face 3 of the backing and the edge 6 of the bar 4 is preferably substantially aligned with the edge 7 of the bar 1. The composite structure thus built up is now returned to the furnace and raised to welding temperature.

The composite structure is then withdrawn from the furnace and after the bar 4 has been carefully lined up with the bar 1, the bar 4 is subjected to a series of light hammer blows to stick the parts together sufficiently to keep them in proper relative position for the subsequent operation. This hammering should be comparatively light, for if the high-speed steel be subjected to heavy blows at this time it is found that cracks may develop in the later stages of the process. After the bars have been stuck together in this manner they are returned to the furnace and reheated. The composite bar is now withdrawn from the furnace and placed beneath a drop hammer and subjected to a few blows sufficient to flatten the parts and bring their engaging surfaces into intimate contact after which it is returned to the furnace and raised to a welding temperature varying beween 2010° and 2025° F. The composite bar is then withdrawn from the furnace and very quickly passed beween a pair of rolls which are set to reduce the thickness of the composite bar substantially to the final thickness of the desired cutter, the entire rolling operation being performed so rapidly that the temperature of the bar will not fall below the critical range, the lower limit of which appears to be approximately 1600° F. During this single rolling the bar is restrained against lateral spreading so that the width of the bar remains substantially unchanged, the reduction in thickness therefore resulting in substantial elongation of the composite bar. This rapid rolling of the composite structure within the critical range of temperature and under very substantial pressure results in the formation of a welded union of high efficiency and of substantially the same character as that commonly attained when welding soft steel to high carbon steel. When thus rapidly worked at or near the welding temperature, the high speed steel behaves in substantially the same way as ordinary steels, and careful examination of the welded blank fails to disclose either surface fissures, internal lines of strain, or change in molecular structure in the high speed steel facing, so that the finished cutter is capable of taking and holding a true cutting edge and withstanding all of the stresses to which such a cutter is subjected in the use for which it is designed.

If during rolling, the bar should curl or warp it may readily be flattened by subjecting it to the action of a flattening hammer preferably having a striking face of an area at least as large as that of the bar. The composite welded bar shown in Fig. 4 is now placed in an annealing furnace and kept at a temperature of approximately 1500° F. for some time after which its temperature is allowed to drop gradually. After annealing, the bar, shown in plan view in Fig. 5, may be cut transversely as indicated by the broken lines 9 in said figure into cutter blades of the desired width, such a blade being shown in Fig. 7. These blades are now preferably heat treated and that edge of the blade having the high-speed steel facing is ground off to produce a cutting edge as indicated at 10, Fig. 8, and the cutter thus produced is ready for use.

In Fig. 8 a somewhat modified procedure is illustrated in which the backing 1ª instead of being scarfed off on its under side, as previously described, is scarfed off on its upper side, the scarfed portion ending in a bevelled shoulder 11. The high-speed steel bar 4ª is provided with a bevelled edge 12 in the same manner as previously described and this bevelled edge is fitted beneath the overhanging shoulder 11 of the backing. The procedure is otherwise the same as that above described, the resulting welded bar being especially useful in the formation of chipper knives such as are used in the wood pulp industry, as these chipper knives are subjected to excessive strains and blows such as tend to separate the high-speed steel from the backing.

In Fig. 9, a further modification is illustrated in which the backing 1ᵇ is formed as a plain flat bar provided with a secondary bar 13 which may be of similar material and which is furnished with an overhanging bevelled shoulder 14, beneath which fits the bevelled edge 15 of the high-speed steel bar 4ᵇ. In making this device the bar 13 may be welded to the bar 1ᵇ before the application of the high-speed steel bar 4ᵇ or at the same time, as desired.

In Fig. 10 a further modification is shown in which the backing bar 1ᶜ is scarfed on its upper surface, the scarfed portion terminating in the bevelled face 16 against which the bevelled face of the high-speed steel bar 4ᶜ rests. While this arrangement may be employed it has some disadvantages due to the fact that the engaging bevelled faces of the bars tend to slide on each other so as to cause the high-speed steel bar to move laterally of the backing during the operation, thus making uncertain a perfect union at the meeting bevelled faces of the bars.

A preferred course of procedure has thus been minutely described, but it is contemplated that various changes in the several steps may be employed as occasion may demand, or that certain steps may be omitted altogether, a cardinal feature of the invention residing in the welding of the high-speed steel bar or plate to the soft steel backing in a single rolling or forging operation and within the temperature range corresponding to the permissible ratio of ductility of the metal whereby the parts are integrally united and reduced substantially to the desired final thickness.

While in the foregoing discussion and in the appended claims I have employed the expression "soft steel" in describing the backing member of the composite cutter it is to be understood that this term has been employed in a generic sense, and while in the usual course of procedure the backing will be formed from low carbon steel of the grade generally known as "cold rolled," the expression "soft steel" as herein used may be taken as including any suitable ferrous material which does not exhibit those distinguishing characteristics, due to the presence of the rarer metals such for example as tungsten or vanadium, which are peculiar to the so-called "high speed steels." It is also to be understood that the latter term is not to be limited in meaning to any specific alloy of iron with the rarer metals providing the alloy employed exhibits to a reasonable degree those physical characteristics usually present in alloys of the class known as "high speed steels."

I claim:

1. That process of making cutters of the kind having a facing of high speed steel and a backing of softer metal which comprises as a step integrally uniting the respective metals in a welding operation completed within the critical range of temperature corresponding to the permissible ductility ratios for union of the metals involving a single elongation of the metals.

2. That process of making cutters of the kind having a facing of high speed steel and a backing of softer steel which comprises as a step completing the welding of the component metals in a single rolling operation within a temperature range corresponding to the permissible ductility ratios for continuous union of the metals.

3. That process of making cutters of the kind having a facing of high speed steel and a backing of soft steel which comprises as steps heating the component metals to welding temperature, and uniting them in a single rolling operation completed before the temperature of the component metals has fallen substantially below 1600° F.

4. That process of making cutters of the kind having a facing of high speed steel and a backing of softer metal which comprises as steps heating the facing and backing to welding temperature, and uniting the parts in a welding operation involving a single elongation of the parts in such manner as to produce a substantially uniform joint between the parts coextensive in area with their juxtaposed faces.

5. That process of making composite cutters of the kind having a high speed steel facing and a backing of soft steel which comprises as steps, superposing the facing and backing, simultaneously heating the facing and backing to bring their juxtaposed faces to welding temperature, and subjecting the parts to a welding operation involving a single elongation of the parts whereby the opposing faces of the parts are integrally united to form a continuous and uninterrupted joint.

6. That process of making composite cutters of the type having a backing of soft steel and a facing of high speed steel which comprises heating the facing and backing to welding temperature, and integrally joining them in a single rolling operation whereby to produce a continuous and uninterrupted union between the parts.

7. That process of making composite cutters which comprises as steps, superposing pieces of relatively soft steel and high speed steel, heating said pieces to the welding temperature, and uniting them by a single pass between rollers.

8. That process of uniting a high speed steel facing to a backing of more ductile metal which comprises as steps superposing the facing and backing members, heating the parts to welding temperature, and welding the parts and concomitantly reducing the thickness of the composite bar thus formed substantially to desired final thickness with a single elongation of the parts.

9. That process of making composite cutters which comprises as steps, placing a bar of high speed steel upon a bar of softer steel, the latter bar being thicker than the cutter to be formed, heating the bars to welding temperature, and welding them together and reducing the thickness of the composite bar substantially to that of the finished cutter in a single rolling operation.

10. That process of making composite cutter blades of the type having a soft backing and a facing of harder material comprising preparing a flat bar of low carbon steel by removing a section from one surface of a shape and size substantially equal to the bar of metal to be welded to its opposite face and welding the bar of harder material to said opposite face.

11. That process of making composite cutters which comprises as steps, preparing a flat bar of relatively soft metal by removing a section from one surface, placing a bar of high speed steel upon the other surface of the first bar opposite the recess found by the removal of said section therefrom, and welding the bars together.

12. That process of making composite cutters of the type having a facing of hard material secured to a backing of softer material which comprises as steps, preparing a piece of soft steel of a thickness greater than the desired thickness of the finished cutter by forming a recess in one surface of a shape and size substantially like that of the piece of harder metal to be welded thereto, placing the latter upon the other surface of the first piece opposite the recess, heating the pieces to welding temperature, and welding them together and concomitantly reducing the thickness of the composite structure substantially to that of the finished cutter by a single pass between rolls.

13. That process of making composite cutters which comprises as steps superposing a piece of high speed steel upon a piece of softer steel, heating to welding temperature, lightly hammering the high speed steel to cause it to adhere to the soft steel sufficiently to maintain the parts in alignment, reheating the parts to welding temperature, and welding them together by a single pass between rollers.

14. That process of making composite cutters which comprises as steps connecting a piece of high speed steel and of soft steel to retain them in proper alignment, flattening the parts to bring them into intimate contact, heating the parts to welding temperature, and integrally uniting the parts and reducing them substantially to final thickness by a single rolling operation.

15. That process of making composite cutters which comprises as steps heating pieces of high speed and soft steel in contact to the welding temperature, lightly hammering the parts to stick them in aligned position, reheating the parts, flattening the parts to bring them into intimate contact, reheating to welding temperature, and welding the parts into an integral mass by a single pass between rolls.

16. That process of making composite cutters which comprises as steps holding a piece of high speed steel in intimate contact with a backing of softer metal, heating the parts to welding temperature, integrally uniting the parts by a single pass between rolls, and annealing the composite structure thereby formed.

17. That process of making composite cutters which comprises as steps superposing a piece of high speed steel and a piece of soft steel, welding the parts by a single heating and rolling operation, flattening the composite structure thereby formed, annealing such composite structure, and cutting it transversely into strips each having a portion of the high speed steel at one end.

18. That process of making composite cutters comprising superposing a piece of high speed steel and a backing of softer ferrous metal one over the other, heating and flattening the parts, while holding them in alignment, to bring them into intimate contact, reheating to the welding temperature, integrally uniting the parts and reducing them substantially to final thickness by a single rolling operation, flattening the composite structure thus formed, annealing such structure, and cutting it into strips each having a portion of the high speed steel at one end to form a cutting edge.

19. A blank for use in making composite cutters comprising a backing of mild steel and a homogeneous facing of high speed steel integrally united to one face thereof, the integral union between the parts being substantially coextensive in area with the facing.

20. A blank for use in making composite cutters comprising a backing of relatively soft metal and a facing of high speed steel integrally united to said backing at one side thereof, the welded union between the parts being substantially coextensive with the area of the facing, and the latter being substantially free from incipient cracks or lines of internal strain.

Signed by me at Boston, Massachusetts, this 25th day of January, 1923.

ALVIN W. DAVIS.